March 6, 1928.

E. S. LEONARDOS

GARDENING IMPLEMENT

Filed May 31, 1927    2 Sheets-Sheet 1

1,661,729

Inventor

Elefterios S. Leonardos,

By William C. Luton

Attorney

March 6, 1928.
E. S. LEONARDOS
GARDENING IMPLEMENT
Filed May 31, 1927
1,661,729
2 Sheets-Sheet 2
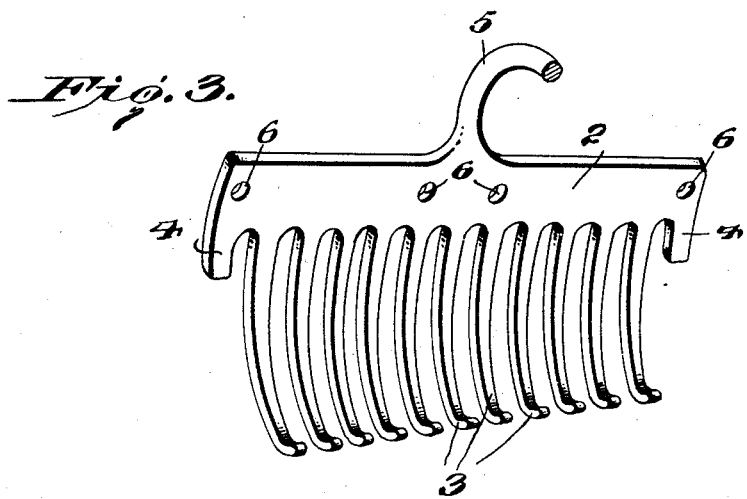
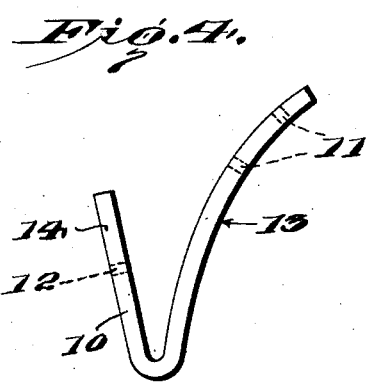
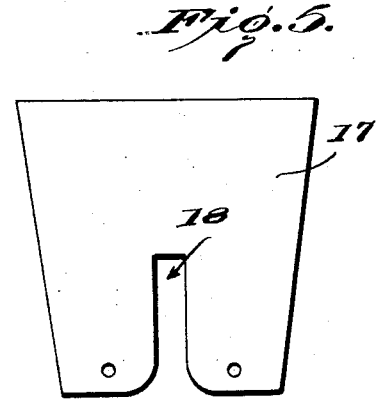
Inventor
Elefterios S. Leonardos
By William C. Linton
Attorney Patented Mar. 6, 1928.

1,661,729

UNITED STATES PATENT OFFICE.

ELEFTERIOS S. LEONARDOS, OF SHREVEPORT, LOUISIANA.

GARDENING IMPLEMENT.

Application filed May 31, 1927. Serial No. 195,498.

This invention relates to improvements in gardening implements having for an object to provide a combined rake and grass or weed cutting implement, the cutting blade thereof being so disposed with respect to the rake teeth or tines that it will, with drawing of the rake over grass, weeds or other vegetation, cut the same to a predetermined height from the soil, the implement thus performing a dual function in but a single working opertion, first, raking or removing trash and other debris from the surface being cleaned or cultivated and second, evenly cutting the grass, weeds or other vegetation.

It is also an object of the invention to provide an implement of the character mentioned having a chopping blade novelly mounted or fixed thereupon, thus permitting the implement to be used for the cutting or chopping of roots and heavier vegetation, such as large weeds and the like.

It is furthermore amongst the principal desiderata of the invention to provide the implement with a rake head so formed or constructed that the cutting blade carrying and attaching brackets may be connected thereto in such a manner as to avoid any and all interference with the normal mode of usage of the rake and yet so positioned that the cutting blade will be disposed in a manner to cause its engagement with vegetation in a fashion to effect a shearing like cutting of the same, hence, assuring a positive and even cutting with but a minimum of resistance.

Other objects of the invention will be in part obvious and in part pointed out hereinafter.

In order that the invention and its mode of operation may be readily understood by those skilled in the art, I have in the accompanying illustrative drawings and in the detailed following description based thereupon, set out one possible embodiment of the invention.

Figure 1:
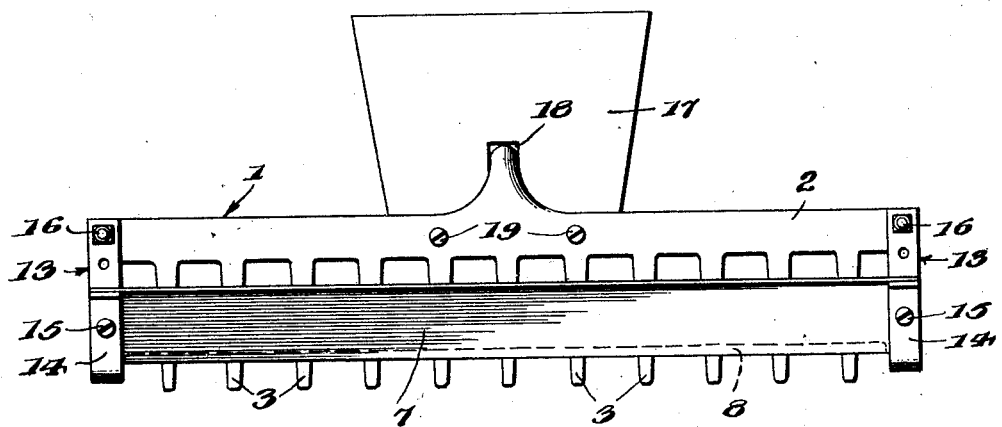
Figure 2:
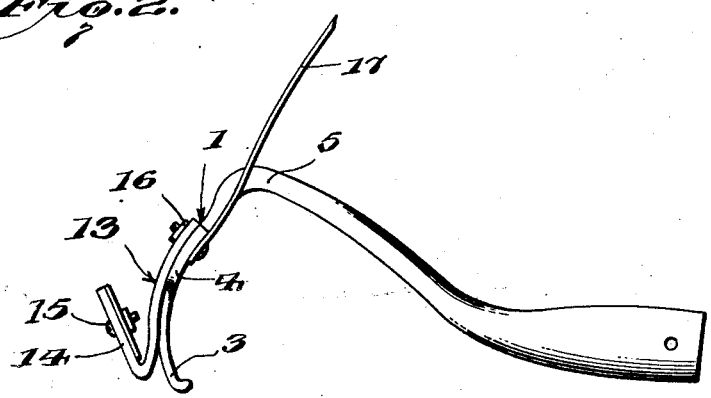

In these drawings:

Figure 1 is a front elevation of an implement constructed in accordance with the invention, Figure 2 is a side elevation of the same, Figure 3 is a detail in perspective of the rake head, Figure 4 is a detail in side elevation of one of the cutting blade securing or mounting brackets, and Figure 5 is a detail in elevation of the hoe-like blade.

Having more particular reference to the drawings, in connection with which like characters of reference will designate corresponding parts throughout, the improved implement may be stated to comprise a rake designated for convenience by the numeral 1, said rake, in this particular embodiment of the invention, being shown as constructed of metal and including the usual head 2 together with the relatively equi-spaced and curved teeth or tines 3, said tines being disposed throughout the greater portion of the length of the head 2 but being spaced inwardly from the opposite extremities of the same as is illustrated in the Figure 3; the said opposite extremities being formed with right angularly disposed fingers 4 which, as will be noted, are arranged in substantially parallelism to the tines 3.

The rake head 2 is provided with the usual handle attaching shank 5 while a plurality of openings 6 are formed therein, as shown in the Figure 3, for a purpose which will be hereinafter more fully described.

A cutting blade designated by the numeral 7 is provided the implement, the length thereof corresponding to the length of the head 2 and having a cutting edge 8 formed thereupon while bolts or similar fastening device receiving openings 9 are formed in the opposite extremities of the same.

That this cutting blade 7 may be porperly mounted with respect to the rake 1 to perform the intended functions of the invention, metal straps or bars, preferably formed of wrought iron or similar material, designated by the numeral 10 are provided; bolt or rivet receiving openings 11 and 12 being formed adjacent the opposite end portions thereof. These metal straps or brackets 10 have portions thereof curved as indicated by the numeral 13 to approximately conform to the curvature of the rake teeth or tines 3, but their respective lengths are such that the lower ends of the same are disposed inwardly and in spaced relation to the free extremities of the curved tines 3, as is shown in the Figure 1; the free extremities of the brackets 10 being angularly disposed or arranged in substantially V-shaped formation as indicated by the numeral 14 whereby to provide means for facilitating the connecting of the cutting blade 7 thereto.

In this connection, it will be noted that in the present embodiment of the invention, I have shown two of the brackets 10 to be employed, although it will be understood that this number may be increased, such as conditions or preference may dictate; also, that the angularly extended portions 14 of said brackets are disposed in a direction away from the normal path of raking movement of the tines 3 so that with the connecting of the cutting blade 7 thereto through the medium of bolts 15 passed through the opening 9 of said blade 7 and the openings 12 in the angular extremity 14, said cutting blade will be disposed in a fashion to effect a shearing like cutting of vegetation engaged thereby with the drawing of the rake 1 over a surface.

That the body portions or curved parts 13 of the brackets 10 may be fixedly connected to the rake head 2, bolts, rivets or other suitable fastening devices 16 are passed through the openings 11 or certain of said openings 11 in the brackets 10 and through the outermost openings 6 of said head 2, the locking nuts of these bolts being tightened to such an extent as to prevent relative movement between the parts interconnected thereby, thus, ensuring a fixed positioning of the cutting blade 7 transversely of the curved tines 3 whereat the cutting edge 8 will be disposed in proximity to the normally lower or free extremities of the tines.

With a view toward providing the implement with means whereby to permit of its usage for the chopping of roots and heavier vegetation, a hoe like chopping blade 17 is employed, said blade tapering throughout its length as is illustrated in the Figures 1 and 5 and having a marginally opening pocket or slot 18 formed longitudinally of the narrower portion thereof, this slot 18 being adapted to receive the laterally extended portion of the shank 5 therethrough so that the blade 17 will effect a straddling like engagement therewith as is illustrated in the Figures 1 and 2; the inner end of the blade being fixed to the adjacent intermediate portion of the rake head 2 by passing bolts or similar fastening devices 19 through the intermediate openings 6 in said rake head 2 and through appropriately arranged openings formed in the inner end of the blade 17. Thus, an effectual and rigid mounting or connection of the chopping blade 17 with the rake 1 will be assured.

In using the improved implement as a means for cutting grass, weeds or other vegetation, the rake is positioned in the normal fashion and is drawn over the soil or other vegetation bearing matter. With this drawing movement of the rake, it is to be understood that the tines 3 thereof are so positioned as to effect a gathering in or raking of trash and other débris, following which the blade 7 will engage with the grass, weeds or remaining vegetation in a manner to effect a shearing like cutting thereof, this cutting operation being facilitated by the angular disposition of the free extremities 14 of the brackets 10 together with the incident angular positioning of the cutting blade 7 with respect to the tines 3.

Should it be desired to change or vary or adjust the angular positioning of the cutting edge 8 of the blades 7 with respect to the lower or free portions of the tines 3, this may be effected by a slight bending of the extremity 14. Furthermore, when it becomes necessary to re-sharpen the edge 8 of the blade 7, said blade may be readily disengaged from the extended portion 14 of the bracket 10 by disengaging the bolts 15 hereinbefore described. Also, should it be desired, provision may be made for adjustment of the blade 7 towards or from the free extremities of the rake tines 3, that is, longitudinally of the angularly extended portions 14 of the bracket 10, this being effected by forming a plurality of openings or slots in and longitudinally of said extremity 14 so as to permit of sliding of the adjacent portions of the blade 7 longitudinally thereof to be followed by a retightening and the fixed mounting or adjustment of the blade with respect to the rake.

When heavy vegetation or weeds or loose furrow are encountered, these may be readily severed by the chopping blade 17, the rake 1 being reversed in such an operation so that the cutting edge of said blade 17 may be brought into striking or chopping engagement with the matter to be so severed. Also, it will be understood and appreciated that because of the mounting of the blade 17 so that the same straddles a portion of the shank 5, the excessive stressing of the connecting bolts 19 employed to secure said blade 17 to the rake head 2 will be prevented and also, that the rigidity of the connection between the chopping blade and the rake head will be thereby increased. If desired the chopping blade 17 may be readily disengaged from the rake head 2 by disengaging the connecting bolts 19 therefrom.

Manifestly, the construction shown is capable of considerable modification and such modification as is within the spirit of my claims, I consider within the scope of my invention.

I claim:

1. An implement including in combination with a rake, spaced brackets on portions of the rake head having the free portions thereof angularly disposed with relation to the rake tines and bent into substantially V-shaped formation, the body portions of said brackets being shaped to correspond to the shaping of said rake tines and disposed coincidentally therewith, and a cutting blade secured to said free portions transversely of said tines and so positioned as to shearingly cut matter engaged thereby with drawing of the rake over a surface.

2. An implement including in combination with a rake, brackets fixedly mounted upon the opposite end portions of the rake head, portions of said brackets being disposed coincidentally with the rake tines, the free portions of said brackets being angularly disposed with respect to the body portions thereof in substantially V-shaped arrangement, and a cutting blade secured to said free portions disposed transversely of the tines and so positioned as to have a shearing like cutting engagement with matter encountered thereby during drawing of the rake over a surface.

3. In combination with a rake, substantially V-shaped brackets secured in spaced relation to the head of said rake, the free portions of said brackets being disposed at angles with respect to the lower portions of the rake tines and arranged rearwardly of the same in slight spaced relation, and a cutting blade secured to the free portions of said brackets disposed transversely of the tines and so positioned as to have a shearing like cutting engagement with matter encountered thereby during drawing of the rake over a surface.

4. An implement of the character described comprising a rake, substantially right angularly disposed short bracket fingers upon the opposite extremities of the rake head disposed in substantial parallelism to the rake tines, brackets fixedly connected to said fingers, and disposed coincidentally with the rake tines, the free extremities of said brackets being angularly bent into substantially V-shaped formation at points spaced inwardly from the free ends of said rake tines, and a cutting blade secured to said free portions of the brackets and disposed transversely of the rake tines and so positioned as to effect a shearing like cutting engagement with matter encountered by the same during drawing of the rake over a surface.

In witness whereof I have hereunto set my hand.

ELEFTERIOS S. LEONARDOS.